United States Patent
James et al.

(10) Patent No.: US 7,405,377 B2
(45) Date of Patent: Jul. 29, 2008

(54) METHOD FOR TESTING UNDERCUT ON THE INNER DIAMETER OF PIPE WELDS

(75) Inventors: Matthew Jay James, Brunswick, OH (US); Patrick J. Coyne, Eastlake, OH (US)

(73) Assignee: Lincoln Global, Inc., City of Industry, CA (US)

( * ) Notice: Subject to any disclaimer, the term of this patent is extended or adjusted under 35 U.S.C. 154(b) by 101 days.

(21) Appl. No.: 11/447,706

(22) Filed: Jun. 5, 2006

(65) Prior Publication Data

US 2007/0278196 A1    Dec. 6, 2007

(51) Int. Cl.
B23K 9/095    (2006.01)
(52) U.S. Cl. .................................. 219/130.01
(58) Field of Classification Search ............ 219/130.01, 219/61, 124.34
See application file for complete search history.

(56) References Cited

U.S. PATENT DOCUMENTS

| | | | |
|---|---|---|---|
| 4,807,991 A | 2/1989 | Carew | |
| 4,877,940 A | 10/1989 | Bangs | |
| 4,920,249 A * | 4/1990 | McLaughlin et al. ... | 219/130.21 |
| 6,024,273 A * | 2/2000 | Ludewig et al. ........ | 219/130.01 |
| 6,392,193 B1 * | 5/2002 | Mallenahalli et al. .. | 219/130.01 |
| 2003/0234239 A1 | 12/2003 | Lee | |

FOREIGN PATENT DOCUMENTS

| | | |
|---|---|---|
| JP | 07-214316 A | 8/1995 |
| JP | 7-214316 A * | 8/1995 |

OTHER PUBLICATIONS

Machine Generated English Translation of JP7-214316A.*
International Search Report dated Feb. 5, 2008.

* cited by examiner

*Primary Examiner*—Clifford C Shaw
(74) *Attorney, Agent, or Firm*—Fay Sharpe LLP; Brian E. Turung (57) ABSTRACT

A method and apparatus of comparing two or more welding flux systems to determine which flux system results in the smallest incidence of undercut about a weld bead in an inner diameter of a pipe.

22 Claims, 2 Drawing Sheets

METHOD FOR TESTING UNDERCUT ON THE INNER DIAMETER OF PIPE WELDS

The invention is directed to the art of welding, more particularly to a test procedure for measuring the undercut of a weld bead, and even more particularly to a test procedure for measuring the undercut of a weld bead in a formed pipe.

BACKGROUND OF THE INVENTION

Large pipe sections are commonly formed by bending large sheets of metal together and then joining the edges of the metal sheet by use of a weld bead. The weld bead is commonly formed by a submerged arc welding process; however, other types of welding processes can be used. After the pipe has been formed, the interior of the pipe is inspected to determine the quality of the weld bead. One common problem encountered after the formation of the weld bead is undercut. Undercut can occur when the welding arcs melt away the edges of the metal sheet and the weld bead does not completely fill in this melted area, thereby leaving a notch or other depressed region between the weld metal and the edge of the metal sheet. The existence of undercut in the weld bead is considered a defect that can result in the formed pipe being declared defective for a particular use.

Various submerged arc welding fluxes and welding techniques have been developed to minimize the occurrence and/or degree of undercut during a welding process. Typically the occurrence and degree of undercut are visually measured by an individual physically moves through the formed pipe and visually inspects the weld bead with a light. In view of the fact that an individual is inspecting the formed weld bead, the determination regarding the severity and amount of undercut can be somewhat subjective. As such, it can often be difficult to effectively determine whether a certain consumable electrode, particular welding setting and/or particular welding flux result in a greater or lesser degree of undercut during the formation of a pipe.

In view of the state of the art of pipe welding, there is a need for standardized method for accurately evaluating the occurrence and/or degree of undercut of a weld bead.

SUMMARY OF THE INVENTION

The present invention is directed to a method and apparatus for locating and/or measuring the undercut of a weld bead, and particularly to a method and apparatus for locating and/or measuring the undercut of a weld bead in a formed pipe. Although the present invention will be described with particular respect to the detection and evaluation of undercut of a weld bead in the inner diameter of a formed pipe, it will be appreciated that the method and apparatus can be used to evaluate the undercut of a weld bead in applications other than the formation of pipes. It will also be appreciated that the method and apparatus of the present invention are not limited to the detection and/or evaluation of undercut of a weld bead, but can be used to evaluate other regions and/or properties of a formed weld bead.

In one non-limiting aspect of the present invention, there is provided a method and apparatus that can be used to evaluate the relative tendency of fluxes intended for use in pipe welding to exhibit undercut of the weld bead on the inner diameter (ID) of the pipe. Undercut on the ID of the pipe is one of the most common types of defects experienced by pipe mills. The existence of any degree of undercut can be considered a defect in the forming of a pipe. Some types of undercut can be repaired by grinding out the region about the undercut; however, some undercut is so severe that the pipe has to be discarded or sold as a lesser grade pipe. Attempted repair of the undercut of the weld bead on the ID of the pipe can be difficult and time consuming since such procedure involves the use of one or more individuals having to travel into the pipe to actually make the repair. It has been found that different flux compositions can result in an increase or decrease in the frequency and degree of undercut of the weld bead on the ID of the pipe during the formation of a pipe. Typically a submerged arc welding arrangement is used to form the initial weld bead during the formation of a pipe; however, other welding arrangements can be used. The composition of the welding flux has been found to affect the properties of the welding arc and wetting properties of weld metal during the welding operation. These properties and/or others affect the quality of the weld bead and the occurrence of undercut of the weld bead on the ID of the pipe. After a pipe is formed, a visual inspection of the ID of the pipe is conducted to determine if any undercut exists. In view of the fact that the manual inspection of undercut is somewhat subjective and will vary based on the particular inspector, there has been some difficult in determining which flux system for a particular welding operation results in the least about of undercut. Typically, a pipe welding facility uses a particular flux system in association with particular welding parameters that the facility has traditionally used, and resists change to the type of flux system and/or welding parameters used. This resistance to change has been largely based in part to a lack of qualitative data that provide objective comparative information regarding the quality of a weld bead formed by the use of a particular flux system and/or use of particular welding parameters. The present invention overcomes this past problem. In one non-limiting embodiment of the invention, there is provided a method and apparatus for providing objective comparative information regarding the quality of a weld bead formed by the use of a particular flux system and/or use of particular welding parameters. This information can be used to 1) objectively compare various flux systems to determine the best flux system for reducing the incidence and/or degree of undercut during a particular welding procedure; and/or 2) objectively compare various welding parameter settings to determine the settings for reducing the incidence and/or degree of undercut during a particular welding procedure. The apparatus and method of the present invention provide a standardized method for evaluating occurrence and/or degree of undercut of a weld bead. In another and/or alternative embodiment of the present invention, there is provided a method for detecting and/or evaluating the weld bead for undercut by use of a particular welding procedure used to form the weld bead and a particular procedure to evaluate the formed weld bead for undercut. This standardization of welding procedures and evaluation procedures overcomes past problems associated with the existence of welding procedures that vary significantly from one pipemill to the next.

In another and/or alternative non-limiting aspect of the present invention, there is provided at least one standardize welding procedure that is used to evaluate the effectiveness of various flux compositions. When comparing two or more flux compositions, a standardized welding procedure should be used for each weld bead that is formed by the different welding flux compositions so that the effectiveness of a certain flux composition can be compared with a weld bead formed by another flux composition. Welding procedures can vary significantly from pipemill to pipemill, thus it is important to conduct testing of the various flux compositions at a set range of procedures. In one embodiment of the invention, the following welding parameters are used to compare the effectiveness of two of more flux compositions:

PROCEDURE A

|  | Arc 1 | Arc 2 | Arc 3 |
|---|---|---|---|
| Polarity | AC | AC | AC |
| Electrode Diameter | 5/32" | 5/32" | 5/32" |
| Amps | 650 | 630 | 560 |
| Volts | 32 | 35 | 38 |
| Electrode angle | −5° | +4° | +17° |
| Electrode stick-out (in.) | 1 | 1 | 1 |
| Spacing of electrodes from centerline to centerline (in.) | 5/8" | 5/8" | 5/8" |
| Travel speed of electrodes (in./min) | 66 | 66 | 66 |

The welding procedure set forth above for use with an L-70 electrode which is provided by The Lincoln Electric Company is commonly used in various pipemills. As can be appreciated, other types and sizes of the consumable electrode can be used in accordance with this invention. The welding procedure uses appropriate levels of current and voltage when forming a pipe. The current decreases from the lead electrode (Arc 1) to the trailing electrode (Arc 3) and the voltage increases from the lead electrode (Arc 1) to the trailing electrode (Arc 3). In addition, the electrode angles for each electrode are not excessive.

Prior to the forming of the weld bead, the three electrodes should be checked to ensure that the electrodes are all properly aligned and are at the "dead bottom center" (DBC) of the pipe to be welded. Improper alignment and/or positioning of the electrodes can result in undercutting of the weld bead that is not related to the performance of the flux system. Electrode alignment should be checked after every weld bead since the electrodes can become misaligned due to a "hard start" or if the cast/pitch of the electrodes changes. One non-limiting method of aligning the electrodes at the dead bottom center of the pipe is as followings:

1) Mark two points at the DBC approximately 6" apart at the end of the pipe.
2) Connect these points with a straight line. Do not rotate the pipe until the electrodes are aligned. If rotation occurs, the pipe will have to be remarked.
3) Move the pipe along a path as if a weld was going to be made.
4) Position the electrodes over the line at DBC.
5) Set contact tip to work distance (CTWD) and move electrodes down until the electrodes touch the pipe.

If all electrodes do not fall on or near the line (e.g., ±1/8", etc.) at DBC, the electrodes need to be realigned.

Procedure A is merely representative of one type of standardized welding procedure for use with three electrodes that can be used in accordance with the present invention. As can be appreciated, procedures could be developed for a different number of electrodes (e.g., 2, 4, etc.). Two other non-limiting welding procedures that can be used in accordance with the present invention are set for as follows:

PROCEDURE B

|  | Arc 1 | Arc 2 | Arc 3 |
|---|---|---|---|
| Polarity | AC | AC | AC |
| Electrode Diameter | 5/32" | 5/32" | 5/32" |
| Amps | 900 | 750 | 550 |
| Volts | 40 | 42 | 40 |
| Electrode angle | −5° | 0° | +15° |
| Electrode stick-out (in.) | 1.25 | 1.25 | 1.25 |
| Spacing of electrodes from centerline to centerline (in.) | 0.75 | 0.75 | 0.75 |
| Travel speed of electrodes (in./min) | 66 | 66 | 66 |

PROCEDURE C

|  | Arc 1 | Arc 2 | Arc 3 |
|---|---|---|---|
| Polarity | AC | AC | AC |
| Electrode Diameter | 4 mm | 4 mm | 4 mm |
| Amps | 865 | 670 | 565 |
| Volts | 32 | 35 | 38 |
| Electrode angle | −20° | −5° | +15° |
| Electrode stick-out (in.) | 1.26 | 1.26 | 1.26 |
| Spacing of electrodes from centerline to centerline (in.) | 0.827 | 0.827-0.866 | 0.0866 |
| Travel speed of electrodes (in./min) | 66.93 | 66.93 | 66.93 |

Welding Procedures B and C also is use with an L-70 electrode which is provided by The Lincoln Electric Company and is also commonly used in various pipemills. As can be appreciated with types and sizes of consumable electrodes could be used. Procedure B uses high current and voltage and the voltage is higher on the middle electrode (Arc 2) than it is on the lead (Arc 1) or the trailing electrode (Arc 3). Welding Procedure C uses a somewhat high current and the electrode angles (particularly on the lead electrode) is somewhat extreme. Prior to forming a weld bead with Procedures B or C, the three electrodes should be checked to ensure that the electrodes are all properly aligned and are at the DBC of the pipe to be welded. One non-limiting alignment procedure that can be used in accordance with the present invention is set forth above.

In accordance with still another and/or alternative non-limiting aspect of the present invention, there is provided a method for objectively evaluating a formed weld bead. The method is particularly adapted for use in detecting and/or evaluating the existence/degree of undercut of a formed weld bead at the inner diameter of a pipe; however, it will be appreciated that the method can be used to detect and/or evaluate other or additional aspects of a formed weld bead, and/or be used to detect and/or evaluate aspects of a formed weld bead that are form in workpieces other than a pipe. In one embodiment of the invention, the method includes the steps of 1) mounting a scanner for at least partial movement inside a pipe, 2) moving the scanner at least partially inside the pipe while the scanner at least periodically scans at least a portion of a weld bead, and 3) at least partially analyzing data from the scanner to determine the existence of undercut in a weld bead and/or the degree of undercut in a weld bead. In one aspect of this embodiment, the scanner can include one or more scanners. If two or more scanners are used, the scanner can be the same type of scanner or can be differing types of scanners. Various types of scanners can be used to analyze one or more portion of the weld bead such as, but not limited to, an electromagnetic wave sensing device (e.g., laser scanner, visible light scanner, inferred scanner, ultraviolet scanner, video recorder, x-ray device, etc.), a sound wave device (e.g., ultrasonic wave scanner, etc.), a magnetic field sensing device, and/an electric current/voltage sensing device (e.g., eddy current detector, etc.). In one non-limiting configuration, the scanner includes a laser scanner. In another and/or alternative aspect of this embodiment, the scanner can be mounted on a track such that the scanner can be moved and/or operated at least partially along the weld bead manually, semiautomatically or automatically. The semiautomatic or automatic movement and/or operation of the scanner can be used to eliminate the need for an individual to enter the interior of the pipe as the weld bead is at least partially scanned. This can be a useful feature for smaller diameter pipes that are difficult, if not impossible to enter by an individual. As such, the use of an individual to manually view the weld bead in the pipe and/or operate the scanner while in the pipe can be eliminated. The partial or full automation of movement and/or operation of the scanner can also or alternatively result in quicker scans of the weld bead and/or a more uniform scan of the weld bead. The partial or full automation of movement and/or operation of the scanner can also or alternatively enable an operator to remotely scan one or more portions of a weld bead, rescan one or more portions of a weld bead, control one or more parameters of the scanner, control the speed of the scanner along the weld bead, and/or control the direction of movement of the scanner along the weld bead. As can be appreciated, other or alternative aspects of the scanner and/or operation of the scanner can be controlled remotely.

In yet another and/or alternative non-limiting aspect of the present invention, location information can be provided to identify a location undercut in the weld bead. The location information can be used by an individual to locate the undercut in the weld bead in the interior of the pipe. Once the undercut is located, a visual determination can be made as to the severity of the undercut and/or whether the undercut can be repaired. The location information can include, but is not limited to, a physical marking on and/or near the location of the undercut (e.g., chalk mark, spray paint, etc.), and/or position location information (e.g., G.P.S. location, LAN location, position in pipe relative to one or more pipe ends and/or other reference point of the pipe, etc.). In one non-limiting embodiment of the invention, the scanner and/or a device associated with or accompanying the scanner physically inserts a locator (e.g., chalk mark, spray paint, etc.) on and/or near a region identified by the scanner as including undercut and/or some other predefined feature of a weld bead (e.g., excessive weld metal build-up, non-uniform weld bead profile, insufficient fill, etc.). In one non-limiting aspect of this embodiment, the scanner and/or a device associated with or accompanying the scanner sprays a paint or chalk mark on and/or near a region identified by the scanner as including undercut and/or some other predefined feature of a weld bead as the scanner moves along at least a portion of the weld bead. The marking typically has a size, color and/or other attribute that facilitate in the location of the marking when an individual enters the pipe and looks for the marker; however, this is not required. In another and/or alternative non-limiting embodiment of the invention, the scanner and/or a device associated with or accompanying the scanner electronically saves and/or transmits a location parameter (e.g., G.P.S. location, etc.) that identifies a location at and/or near the location identified by the scanner as including undercut and/or some other predefined feature of a weld bead. In one non-limiting aspect of this embodiment, the scanner and/or a device associated with or accompanying the scanner electronically saves a location parameter that is associated with the location that the scanner identified the existence of undercut and/or some other predefined feature of a weld bead as the scanner moves along at least a portion of the weld bead. The stored location information can be read from the scanner device, printed out from the scanner device, transmitted from and/or downloaded from the scanner (real time and/or at a later time) to another device and/or system (e.g., internet, intranet, main frame computer, laptop computer, tablet computer, palm pilot, beeper, cell phone, blackberry, etc.). When information is transmitted and/or downloaded from the scanner and/or a device associated with the scanner, the information can be transmitted and/or downloaded by a hardwired connection and/or wirelessly.

In still yet another and/or alternative non-limiting aspect of the present invention, the scanner and/or a device associated with the scanner stores and/or transmits information regarding one or more portions of a scanned weld bead and the information. In one non-limiting embodiment of the invention, the stored and/or transmitted information can be used to created real-time images of the scanned weld bead and/or be used to view images of the weld bead at some later time. The images can be 2-D images, 3-D images, etc. These images can be used to assess the existence of the undercut, assess the severity of the undercut, and/or facilitate in repairing the undercut. In another and/or alternative non-limiting embodiment of the invention, the stored and/or transmitted information can be processed by one or more logic circuits and/or by one or more software programs to assess the existence of the undercut, assess the severity of the undercut, and/or facilitate in repairing the undercut. In one aspect of this embodiment, the one or more logic circuits and/or by one or more software programs include one or more predetermined parameters, which one or more predetermined parameters are used to 1) identify the existence of undercut, 2) determine the severity of undercut, 3) determine the quality of the scanned information, and/or 4) monitor one or more operations of the scanner and/or devices associated with the scanner. As can be appreciated, the one or more predetermined parameters can be used for other or additional reasons. As such, the one or more parameters can be used to control the operation of the scanner and/or one or more devices associated with the scanner, activate one or more alarms (e.g., visual alarm, audible alarm, etc.), cause data to be transmitted and/or stored, etc.

In one non-limiting application of the present invention, there is provided a method and apparatus for comparing two or more different flux systems to determine with flux system forms the better weld bead during a pipe welding operation. This method and apparatus can be used as a marketing tool by a flux manufacturer and/or distributor to compare competing flux systems and to attempt to market the flux system over competing flux systems. This method and apparatus can also or alternatively be used as an analytical tool at a pipemill to determine which existing flux system forms the highest quality weld bead. This method and apparatus can also or alternatively be used as an analytical tool by a flux system manufacturer to develop new flux systems and/or designate welding parameters to be used with new or existing flux systems to form higher quality weld beads.

In one non-limiting operation of the apparatus and method of the present invention, the first step is the use of a standardized welding procedure for each weld bead that is formed. This standardization of the welding procedure is important when attempted to compare the effectiveness of two of more different flux systems. The standardized welding procedure can be the same as or different from Welding Procedures A-C set forth above. It is not uncommon for the standardized welding procedure to be the same as or similar to a welding procedure that is regularly used at a particular pipemill when the method and apparatus are being used to compare various flux systems at such pipemill. The second step is to use a standardized method for scanning one or more portions of a weld bead formed by a particular flux system. This standardization of the scanning of the formed weld bead is also important when attempted to compare the effectiveness of two of more different flux systems. The standardization of the scanning of the weld bead can take a variety of forms. What is most important is that the scanning be done in substantially the same way for each scanned weld bead when attempting to determine which flux system forms the higher quality weld bead. One non-limiting method for scanning a weld bead is as follows:

a. Form a weld bead on a pipe with use of a particular flux system.
b. Mount scanner on a guide to enable scanner to move at least partially along the guide.
c. Position the guide at least partially in the ID of the pipe such that the scanner is positioned at or near a portion of the weld bead. Depending in part on the type, configuration and size of the scanner, the complete weld or only a portion of the weld bead will be scanned during a single pass of the scanner. When only a portion of the weld bead is to be scanned during a single pass, multiple passes of the scanner may be used to obtain a complete scan of the weld bead. For instance, one edge of the weld bead can be scanned by one pass of the scanner and the other side of the weld bead can be scanned by a second pass of the scanner.
d. Activate the scanner.
e. Move the scanner along the guide to scan at least a portion of the weld bead in the ID of the pipe.
f. Terminate movement of scanner when a desired portion of the weld bead has been scanned.
g. Printout, save, download and/or transmit data obtained from scanner and/or device associated with scanner.
h. Repeat steps a-g when comparing the effectiveness of a plurality of flux systems.
i. Analyze data generated during the scanning of one or more weld beads. The analyzed data can be used to identify the existence of undercut, identify the degree of undercut, the location of the undercut along the weld bead, etc.

As can be appreciated, the method set forth above can include more or fewer steps.

One non-limiting object of the present invention is the provision of a method and apparatus for objectively analyzing one or more properties of a weld bead.

Another and/or alternative non-limiting object of the present invention is the provision of a method and apparatus that can be used to objectively compare two or more weld beads formed by a different flux system and/or by use of one or more different welding parameters (e.g., voltage level, current level, current waveform, polarity, electrode type, electrode angle, electrode stick-out, electrode spacing, wire feed speed, electrode travel speed, shield gas, etc.).

Still another and/or alternative non-limiting object of the present invention is the provision of a method and apparatus that standardizes the method for evaluating the occurrence and/or degree of undercut.

Yet another and/or alternative non-limiting object of the present invention is the provision of a method and apparatus that can reduce or eliminate the need for human inspection of undercut.

Still yet another and/or alternative non-limiting object of the present invention is the provision of a method and apparatus that can be used as a marketing tool and/or analytical tool to evaluate the quality of weld beads formed by different flux systems and/or by use of one or more different welding parameters.

These and other advantages will become apparent to those skilled in the art upon the reading and following of this description taken together with the accompanying drawings.

BRIEF DESCRIPTION OF THE DRAWINGS

Reference may now be made to the drawings, which illustrates an embodiment that the invention may take in physical form wherein.

DETAILED DESCRIPTION OF THE INVENTION

The present invention is directed to an apparatus and method of analyzing a weld bead formed during the manufacture of pipe. The invention will be described with particular reference to analyzing a weld bead formed on pipe; however, it will be appreciated that the apparatus and method of the invention is not limited to analyzing a weld bead formed on pipes. The invention will also be described with particular reference to the detection of undercut about a formed weld bead; however, it will be appreciated that the method and apparatus can be used to analyze and/or detect other or additional features of a weld bead.

The method and apparatus of the present invention is particularly useful in evaluating the relative tendency of fluxes intended for use in pipe welding to exhibit undercut of the weld bead on the inner diameter (ID) of the pipe. The formation of undercut on the ID of the pipe results in a defective pipe weld. This defect must be repaired or the pipe will have to be discarded and/or sold as a lower grade pipe. Attempted repair of the undercut of the weld bead on the ID of the pipe can be a difficult and time-consuming procedure. Particular flux compositions can decrease the frequency and/or degree of undercut about the weld bead on the ID of the pipe. The apparatus and method of the present invention provide an objective mechanism to obtain comparative information regarding the quality of a weld bead formed by the use of a particular flux system and/or use of particular welding parameters. This information can then be used to a) objectively compare various flux systems to determine the best flux system for reducing the incidence and/or degree of undercut during a particular welding procedure; and/or b) objectively compare various welding parameter settings to determine the settings for reducing the incidence and/or degree of undercut during a particular welding procedure.

Figure 1:
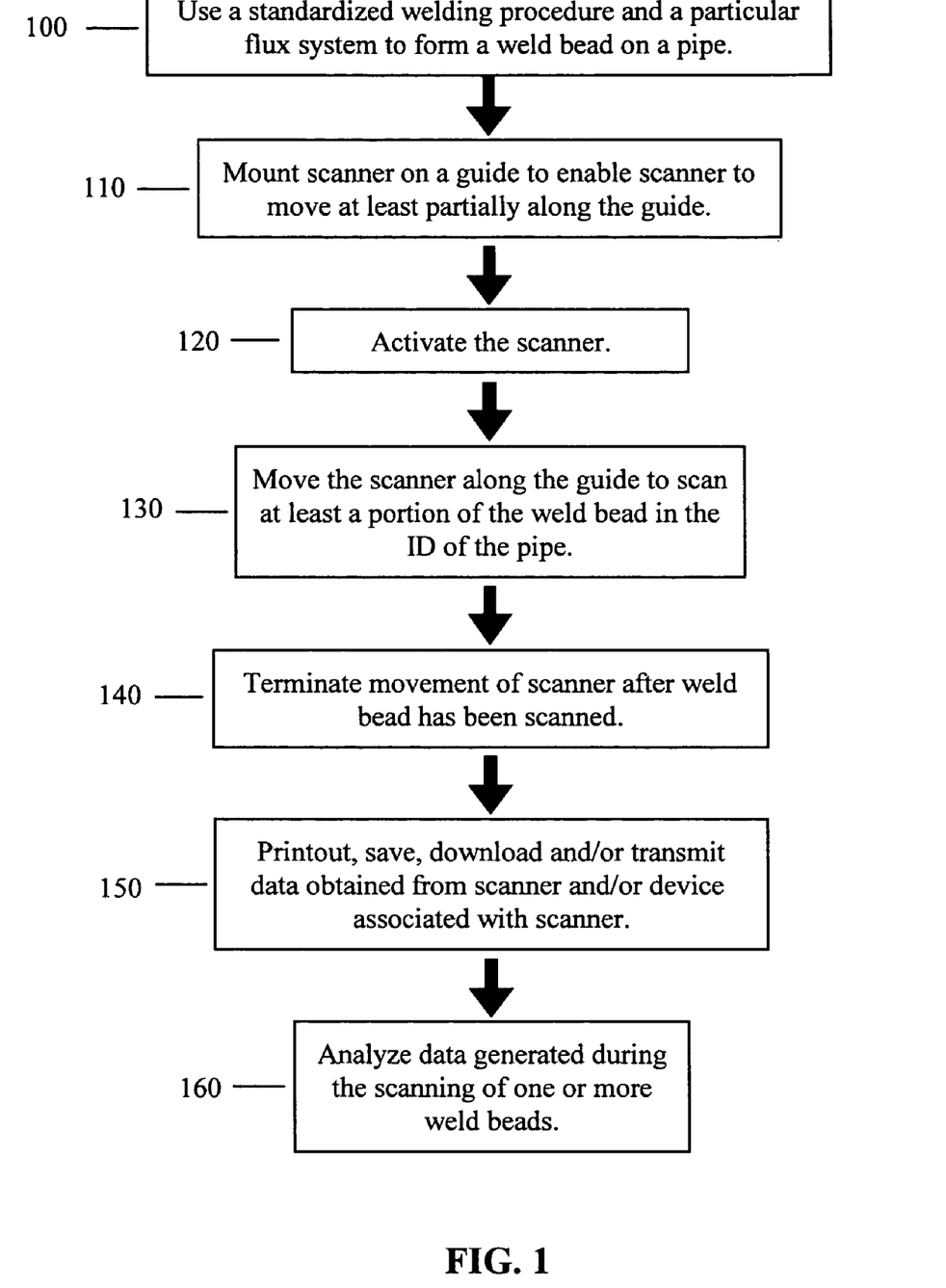
FIG. 1 illustrates one non-limiting method for detecting undercut about a weld bead in the inner diameter of a pipe; and, FIG. 2 illustrates one non-limiting the guide wheel position of the scanner relative to the weld bead.

Referring now to FIG. 1, the flow chart illustrates one non-limiting method for objectively comparing various flux systems to determine the best flux system for reducing the incidence and/or degree of undercut during a particular welding procedure. Step 100 requires that at least one standardize welding procedure is used to form the weld bead on a pipe by use of the various flux compositions. The particular welding procedure for forming the weld bead is not so important as using the same welding procedure when forming a weld bead from different flux system. One non-limiting weld procedure that can be used in accordance with the present invention is set forth below:

Welding Procedure

WELDING PROCEDURE

|  | Arc 1 | Arc 2 | Arc 3 |
|---|---|---|---|
| Polarity | AC | AC | AC |
| Electrode Diameter | 5/32" | 5/32" | 5/32" |
| Amps | 650 | 630 | 560 |
| Volts | 32 | 35 | 38 |
| Electrode angle | −5° | +4° | +17° |
| Electrode stick-out (in.) | 1 | 1 | 1 |
| Spacing of electrodes from centerline to centerline (in.) | 5/8" | 5/8" | 5/8" |
| Travel speed of electrodes (in./min) | 66 | 66 | 66 |

The welding procedure set forth above for use with an L-70 electrode which is provided by The Lincoln Electric Company is commonly used in various pipemills. As can be appreciated, other types and/or sizes of electrodes can be used.

Prior to beginning the formation of the weld bead, the three electrodes should be checked for proper alignment and that the electrodes are at the DBC of the pipe. Improper alignment and/or positioning of the electrodes can result in undercutting about the weld bead that is not related to the performance of the flux system. Electrode alignment should also be checked after every weld bead since the electrodes can become misaligned due to a "hard start" or if the cast/pitch of the electrodes changes during a previous formation of a weld bead. As can be appreciated, various procedures can be used to properly align the electrodes. One non-limiting procedure for use with three electrodes is set forth below:

a) Mark two points at the DBC (e.g., approximately 6' apart, etc.) at the end of the pipe.
b) Connect these points with a straight line. Do not rotate the pipe until the electrodes are aligned.
c) Move the pipe along a path as if a weld was going to be made.
d) Position the electrodes over the line at the DBC.
e) Set contact tip to work distance (CTWD) and move electrodes down until the electrodes touch the pipe.

The electrodes should be aligned so as to fall on or near the line (e.g., ±1/16") at DBC.

Once a weld bead has been formed using a particular flux system and a particular welding procedure, the formed weld bead in the ID of the pipe is analyzed. Steps 110-160 are non-limiting examples of a standardized method for analyzing the formed weld bead. The basic steps of this method include a) mounting a scanner for at least partial movement inside the pipe, b) moving the scanner at least partially inside the pipe while the scanner at least periodically scans at least a portion of the weld bead, and c) at least partially analyzing data from the scanner to determine the existence of undercut in a weld bead and/or the degree of undercut in a weld bead. The scanner that can be used in the method and apparatus of the present invention is a laser scanner. One non-limiting laser scanner that can be used is a WISC scanner provided by Servo-robot, Inc. As can be appreciated, other types of scanners can be used.

Referring again to FIG. 1, step 110 requires the scanner to be mounted on a guide such as a track or welding boom so that the scanner can be moved and/or operated at least partially along the weld bead. Various bracket arrangements, etc. can be used to mount the scanner to the guide. The scanner can be designed to be manually, semiautomatically or automatically moved along the guide. Once the scanner has been mounted to the guide, the scanner should be positioned at or near the weld bead so that proper detection of undercut can be achieved. Typically the guide such as a welding boom is moved into close proximity to the weld bead in the ID of the pipe. The guide should be carefully positioned in the ID of the pipe so as to inhibit or prevent damage of the scanner. Once the guide is in position, further fine adjustment of the scanner position may be necessary. This can be accomplished by adjusting the scanner mounting arrangement (e.g., brackets, clamps, etc.) that secure the scanner to the guide.

Figure 2:
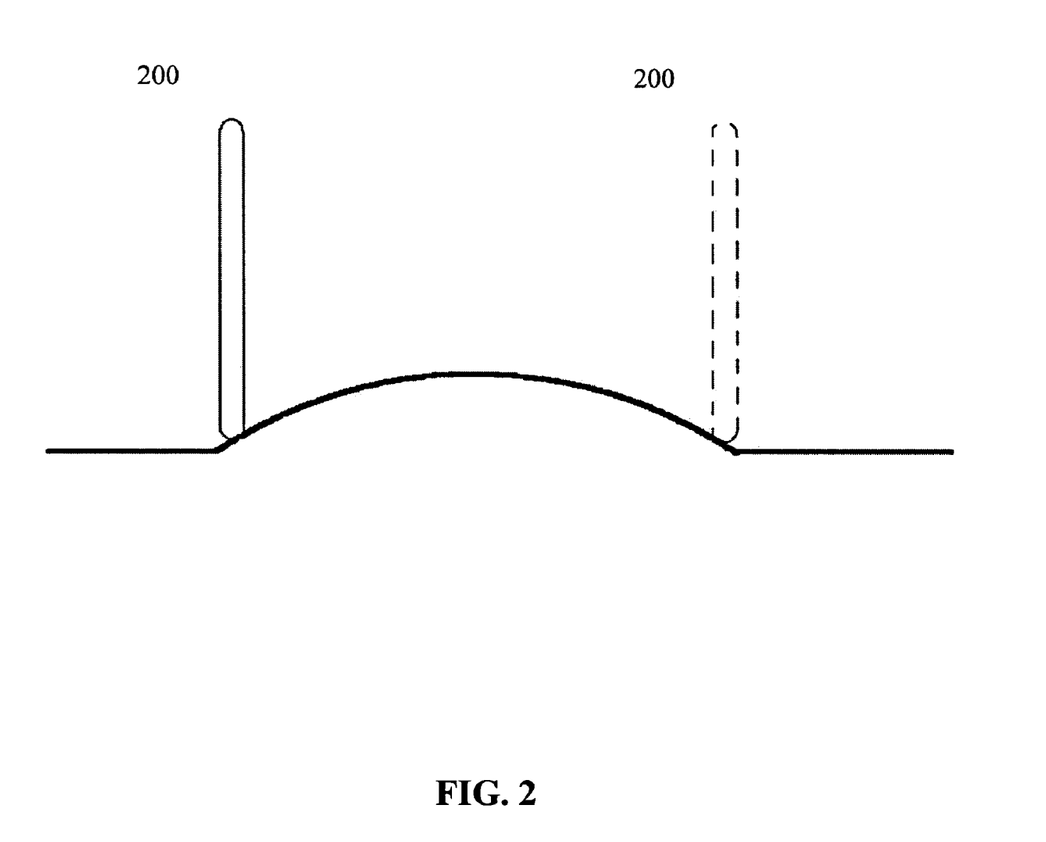

The scanner can include a guide wheel or other guide mechanism to facilitate in the proper orientation of the scanner from the weld bead or portion of the weld bead to be detected by the scanner. In one non-limiting configuration, the WISC scanner is used to detect undercut on one side of the weld bead. As such, at least two scans by the scanner are used to detect undercut on both sides of the weld bead. As can be appreciated, the scanner can be designed to scan both sides of a weld bead in a single scan. Referring now to FIG. 2, there is illustrated a guide wheel 200 that is rotatably secured to the scanner and/or mounting arrangement for the scanner. The guide wheel is designed to roll along an edge of weld bead B and pipe edge PE. The guide wheel facilitates in ensuring that the scanner is properly spaced from the weld bead and pipe edge and that the scanner is following the proper path along the edge of the weld bead. As can be appreciated, other or additional mechanisms can be used to facilitate in ensuring that the scanner is properly spaced from the weld bead and pipe edge and/or the scanner follows the proper path along the edge of the weld bead.

Once the scanner has been properly positioned in the ID of the pipe, the scanner is set and activated as illustrated in step 120. Some scanners provide continuous scans whereas other scanners scan at some interval. If the scanner is designed to scan at certain intervals, the scanner generally is set so as to perform a scan within 2 mm of a previous scan, and typically within about 0.2 mm of a previous scan; however, other scan intervals can be used. Some scanners allow for the adjustment of the width of the scan. The width of the scan should be selected to ensure that the region about the PE and edge of the weld bead W is properly scanner so as to properly detect the existence of any undercut. The formed weld bead is typically not formed in a perfectly straight line (e.g., warping, etc.). As such, the width of the scan should be selected to be sufficient to account for a nonlinear weld bead.

After the scanner has been activated, the scanner is moved along the guide to scan the weld bead as illustrated in step 130. The speed at which the scanner moves along the guide will depend in part on the type of scan and the amount of information being obtained by the scanner and/or other devices associated with the scanner.

Once the desired portion of the weld bead is scanned, the movement of the scanner is terminated as illustrated in step 140. After the scanner movement has been terminated, information obtained by the scanner and/or devices associated with the scanner can be printed out, saved, downloaded into another device, transmitted to another device, etc. as illustrated in step 150. As can be appreciated, the information obtained by the scanner and/or devices associated with the scanner can be printed out, saved, downloaded into another device, transmitted to another device, etc. while the scanner is scanning; however, this is not required.

If only a portion of the weld bead has been scanned, the scanner can be repositioned so as to continue the scanning of the weld bead and step 120-150 can be repeated. FIG. 2 illustrates a repositioned guide wheel 200, shown in dotted lines, that will guide the scanner on the other side of the weld bead.

After the scanner has completed the scanning of the weld bead, the information can then be analyzed as illustrated in step 160. As can be appreciated, information can be downloaded and/or transmitted from the scanner and/or other devices associated with the scanner prior to the scanner completing the scan of the weld bead; however, this is not required. The information can be such that the information merely provides an indication that an undercut was detected during a scan. As can be appreciated, the provided information can be more complex so as to provide 2-D images or 3-D images of the weld bead that has been scanned. The provided information can also include location information; however, this is not required. The type and/or amount of information process for review will be in part based on the scanner and the information desired for viewing by the user.

When two or more flux systems are being compared to determine which flux system form the higher quality weld bead, steps 100-160 are repeated for the other flux system. The method of the present invention can be used as a marketing tool by a flux manufacturer and/or distributor to compare competing flux systems and to attempt to market the flux system over competing flux systems.

One non-limiting method for comparing two weld beads on the form in a pipe by use of two different flux systems is set forth below:

a. Form a weld bead on a pipe with the use of flux system A and by use of a particular welding procedure.
b. Mount a scanner carriage having a scanner bracket and a guide wheel on a welding boom that is positioned in the ID of a pipe.
c. Mount a WISC scanner to the scanner bracket on the welding boom to enable the WISC scanner to move at least partially along the welding boom.
d. Clean the region about the weld bead, if needed. There should be at least about four (4) feet of clean weld bead.
e. Position the welding boom in the ID of the pipe to position the WISC scanner close to the weld bead. The position of the welding boom should be selected so that the guide wheels contact the ID of the pipe and can easily roll along the ID of the pipe.
f. Position the WISC scanner at the end of the pipe wherein the weld was most recent completed so that the scan of the weld bead is performed in the opposite direction the weld bead was formed.
g. Adjust the guide wheel to be positioned at or near one edged of the weld bead.
h. Set the WISC inspection algorithm to "Lap" mode and properly set the reference plate on the WISC scanner.
i. Set the inspection interval of the WISC scanner to 0.2 mm.
j. Raise the guide wheels on the welding boom and lower the scanner wheels so that the scanner wheels contact the ID of the pipe.
k. Activate the WISC scanner.
l. Start the movement of the scanner carriage along the welding boom at a constant travel speed. The travel speed should be set to about 2-10 inches per minute. If an error light on WISC scanner is illuminated or frequently blinking, the scanner is not positioned correctly to obtain information about the weld bead. At this point, stop the WISC scanner and the scanner carriage and reposition the scanner relative to the weld bead. Once the scanner carriage is repositioned, restart the WISC scanner and the scanner carriage. Repeat the repositioning of the WISC scanner until the error light does not frequently illuminate. Note: The flashing of the error light can also occur because the weld bead is not straight along the length of the pipe. This can occur due to warping that is induced by successive welds in the pipe. When the weld bead is not straight along the length of the pipe, it will be necessary to find the best compromise location for set up of the WISC scanner so that the WISC scanner captures the most possible data from the weld bead. Alternatively, it may be necessary to scan the weld bead in sections if the weld bead is too warped to allow acceptable measurements in one pass.
m. Terminate movement of the scanner carriage at the opposite end of the pipe.
n. Slowly move the weld boom until the scanner wheel is at least 1" from the surface of the ID of the pipe.
o. Move scanner carriage back to beginning position as set forth in step f.
p. Data obtained from the WISC scanner can be saved, stored, downloaded, etc. at this time.
q. Repeat steps e-p to scan other side of the weld bead.
s. Repeat steps a-q to scan another weld bead formed by a flux system B by use of the same welding procedure used to form the weld bead using flux system A.
t. Analyze and compare the scans of the two weld beads to determine which flux system formed a weld bead having the least incident and/or degree of undercut. Note: If the WISC scanner was unable to interpret the entire weld bead because of warping, etc., it may be necessary to "cleanse" the data of the erroneous data points (recognizable as points where all of the measurements are "0").

As can be appreciated, the above method can be modified as deemed appropriate.

In summary, the method and apparatus of the present invention have several advantages over past welding practices. Some of these advantages include:

1. Standardize the method for objectively evaluating the occurrence and/or degree of undercut about a weld bead.
2. Create an automated or semi-automated device for measuring and/or detecting the occurrence and/or the degree of undercut.
3. Reduce or eliminate the need for manual inspection of a weld bead.
4. Automate or semi-automate the inspection of weld beads.
5. Assist in identifying the exact location and/or the degree of undercut about the weld bead.
6. Provide 2-D, 3-D, etc. imaging of the a weld bead and/or region about a weld bead.
7. Objectively evaluate the incidence and/or degree of undercut resulting from different fluxes, different welding settings, and/or different consumable electrodes.
8. Provide an objective method to market flux systems and/or to develop new flux system for welding.

It will thus be seen that the objects set forth above, among those made apparent from the preceding description, are efficiently attained, and since certain changes may be made in the constructions set forth without departing from the spirit and scope of the invention, it is intended that all matter contained in the above description and shown in the accompanying drawings shall be interpreted as illustrative and not in a limiting sense. The invention has been described with reference to a preferred embodiment. Modifications and alterations will become apparent to those skilled in the art upon reading and understanding the detailed discussion of the invention provided herein. This invention is intended to include all such modifications and alterations insofar as they come within the scope of the present invention. It is also to be understood that the following claims are intended to cover all of the generic and specific features of the invention herein described and all statements of the scope of the invention, which, as a matter of language, might be said to fall therebetween.

We claim:

1. A method for comparing a plurality of welding flux systems to determine which flux system results in the smallest incidence of undercut about a weld bead in an inner of a pipe comprising:
   a) selecting a first flux system;
   b) selecting a first welding procedure for forming a weld bead on the pipe;
   c) forming a first weld bead on the pipe by use of said first flux system in combination with said first welding procedure;
   d) electronically scanning at least a portion of said first weld bead to obtain a first set of data about said first weld bead, data about a region about said first weld bead, or combinations thereof;
   e) selecting a second flux system;
   f) forming a second weld bead on the pipe by use of said second flux system in combination with said first welding procedure;
   g) electronically scanning at least a portion of said second weld bead to obtain a second set of data about said second weld bead, data about a region about said second weld bead, or combinations thereof; and,
   h) comparing said first and second sets of data to determine which flux system results in the smallest incidence of undercut about weld beads in the pipe.

2. The method as defined in claim 1, wherein said step of electronically scanning includes the use of a laser scanner.

3. The method as defined in claim 2, wherein said first and second weld beads are scanned at least twice by said scanner, at least one of said scans for each weld bead occurring on or near one side of each of said weld beads and at least one other of said scans for each weld bead occurring on or near an opposite side of each of said weld beads.

4. The method as defined in claim 3, including the step of providing location information for undercut scanned on the pipe.

5. The method as defined in claim 4, wherein said step of electronically scanning includes moving the scanner automatically or semi-automatically in an inner diameter of the pipe.

6. The method as defined in claim 5, including the step of aligning the scanner along a dead bottom center of the pipe.

7. The method as defined in claim 1, wherein said first and second weld beads are scanned at least twice by said scanner, at least one of said scans for each weld bead occurring on or near one side of each of said weld beads and at least one other of said scans for each weld bead occurring on or near an opposite side of each of said weld beads.

8. The method as defined in claim 1, including the step of providing location information for undercut scanned on the pipe.

9. The method as defined in claim 1, wherein said step of electronically scanning includes moving a scanner automatically or semi-automatically in an inner diameter of the pipe.

10. The method as defined in claim 1, including the step of aligning a scanner along a dead bottom center of the pipe.

11. A method for testing the quality of a weld bead on a workpiece comprising the steps of:
    a) selecting a first flux system and first electrode for use in forming a first weld bead;
    b) selecting a first welding procedure to form the weld bead;
    c) forming said first weld bead on the workpiece using the first welding procedure in association with the first flux system and first electrode;
    d) scanning at least a portion of said first weld bead to obtain a first set of data about said first weld bead, data about a region about said first weld bead, or combinations thereof;
    e) analyzing said first set of data to determine the occurrence of undercut in the workpiece;
    f) selecting a second flux system;
    g) forming a second weld bead on the workpiece using the first welding procedure in association with the second flux system and first electrode;
    h) scanning at least a portion of said second weld bead to obtain a second set of data about said second weld bead, data about a region about said second weld bead, or combinations thereof; and,
    i) analyzing said second set of data to determine the occurrence of undercut in the workpiece.

12. The method as defined in claim 11, wherein said workpiece is a pipe.

13. The method as defined in claim 11, wherein said step of scanning includes use of a laser scanner.

14. The method as defined in claim 11, wherein said step of scanning includes scanning said first weld bead at least twice, at least one of said scans for said first weld bead occurring on or near one side of said first weld bead and at least one other of said scans for said first weld bead occurring on or near an opposite side of said first weld bead.

15. The method as defined in claim 11, including the step of providing location information for undercut scanned on the workpiece.

16. The method as defined in claim 11, wherein said step of scanning includes moving a scanner automatically or semi-automatically along a length of said first weld bead.

17. The method as defined in claim 11, including the step of aligning said first electrode on said workpiece prior to forming said first weld bead.

18. The method as defined in claim 11, wherein said step of scanning includes aligning a scanner to said first weld bead formed on said workpiece prior to scanning at least a portion of said first weld bead.

19. The method as defined in claim 11, including the step of transmitting at least a portion of said scanned data to a location remote to a scanner and the workpiece.

20. The method as defined in claim 11, including the step of comparing said first and second sets of data to determine which flux system results in the smallest incidence of undercut about weld beads in the workpiece.

21. A method for testing the quality of a weld bead on a workpiece comprising the steps of:
    a) selecting a first flux system and first electrode for use in forming a first weld bead;
    b) selecting a first welding procedure to form the weld bead;
    c) forming said first weld bead on the workpiece using the first welding procedure in association with the first flux system and first electrode;
    d) scanning at least a portion of said first weld bead to obtain a first set of data about said first weld bead, data about a region about said first weld bead, or combinations thereof;
    e) analyzing said first set of data to determine the occurrence of undercut in the workpiece; and, f) creating a physical mark on the location or near the location of said undercut in the workpiece resulting from said formation of said first weld bead.

22. The method as defined in claim 21, including the steps of f) selecting a second flux system; g) forming a second weld bead on the workpiece using the first welding procedure in association with the second flux system and first electrode; h) scanning at least a portion of said second weld bead to obtain a second set of data about said second weld bead, data about a region about said second weld bead, or combinations thereof; i) analyzing said second set of data to determine the occurrence of undercut in the workpiece; and j) creating a physical mark on the location or near the location of said undercut in the workpiece resulting from said formation of said second weld bead.

* * * * *